March 24, 1964    J. J. BUNDSCHUH ETAL    3,125,939
PHOTOGRAPHIC EXPOSURE COMPUTER Filed Feb. 28, 1963    4 Sheets-Sheet 1

JOHN J. BUNDSCHUH
WILLIAM T. HOCHREITER
RICHARD J. BRESSON
        INVENTORS

BY R. Frank Smith
   Robert W Hampton
        ATTORNEYS

JOHN J. BUNDSCHUH
WILLIAM T. HOCHREITER
RICHARD J. BRESSON
INVENTORS

BY R. Frank Smith
Robert W Hampton
ATTORNEYS

March 24, 1964  J. J. BUNDSCHUH ETAL  3,125,939
PHOTOGRAPHIC EXPOSURE COMPUTER
Filed Feb. 28, 1963  4 Sheets-Sheet 3

JOHN J. BUNDSCHUH
WILLIAM T. HOCHREITER
RICHARD J. BRESSON
    INVENTORS

BY  R. Frank Smith
    Robert W. Hampton
        ATTORNEYS

March 24, 1964  J. J. BUNDSCHUH ETAL  3,125,939
PHOTOGRAPHIC EXPOSURE COMPUTER

Filed Feb. 28, 1963  4 Sheets-Sheet 4

JOHN J. BUNDSCHUH
WILLIAM T. HOCHREITER
RICHARD J. BRESSON
INVENTORS

BY R. Frank Smith
Robert W Hampton
ATTORNEYS

United States Patent Office 3,125,939
Patented Mar. 24, 1964

3,125,939
PHOTOGRAPHIC EXPOSURE COMPUTER
John J. Bundschuh, William T. Hochreiter, and Richard J. Bresson, all of Rochester, N.Y., assignors to Eastman Kodak Company, Rochester, N.Y., a corporation of New Jersey
Filed Feb. 28, 1963, Ser. No. 261,904
4 Claims. (Cl. 95—10)

This invention relates to photographic cameras, and, more particularly, to cameras having fully automatic exposure control systems.

As automatic exposure control systems for cameras become more popular and sophisticated, there is an increasing demand for systems which permit the photographer some choice of exposure factors while, at the same time, assuring the "fool proof" exposure setting that is provided by systems whose exposure factor relations are predetermined ("programmed") by the manufacturer. In most amateur photography, stopping movement is more critical than depth of field, and for this reason amateur photographers are generally interested in being able to select a shutter speed that will assure unblurred images for a given subject matter, while also assuring a proper total exposure.

The present invention provides a relatively simple and economical automatic exposure control system which permits the camera operator to manually select a particular shutter speed, but also provides means for overriding this manual selection when that becomes necessary to prevent underexposure. While the shutter speed control in the system disclosed herein may be set manually for conventional speeds (e.g., $\frac{1}{250}$, $\frac{1}{125}$, $\frac{1}{60}$ sec.), the automatic setting of the exposure control mechanism may select any speed from the continuum between the upper and lower limits of the shutter mechanism, thereby minimizing the effect of the automatic override by selecting the highest possible speed commensurate with good exposure. The present invention comprises a simple system of differential levers for controlling shutter speed and aperture size in accordance with scene brightness, and provides means for automatically adjusting the relative position of the levers for film speed in accordance with information encoded on a film cassette adapted for use with the camera.

It is an object of this invention to provide a new and improved automatic exposure control system for photographic cameras.

Another object of this invention is to provide a relatively simple and economical automatic exposure control system permitting manual selection of shutter speed while providing means for overriding this manual setting when necessary to obtain proper exposure.

Still another object is to provide means whereby film speed information encoded on a film cassette is automatically introduced into the computer portion of the camera's automatic exposure control system whenever the cassette is inserted into the camera.

Other objects, purposes, and characteristic features of the present invention will be in part obvious from the accompanying drawings, and in part will be pointed out as the description of the invention progresses. In describing the invention in detail, reference will be made to the accompanying drawings in which like reference characters designate corresponding parts throughout the several views, and in which.

Figure 1:
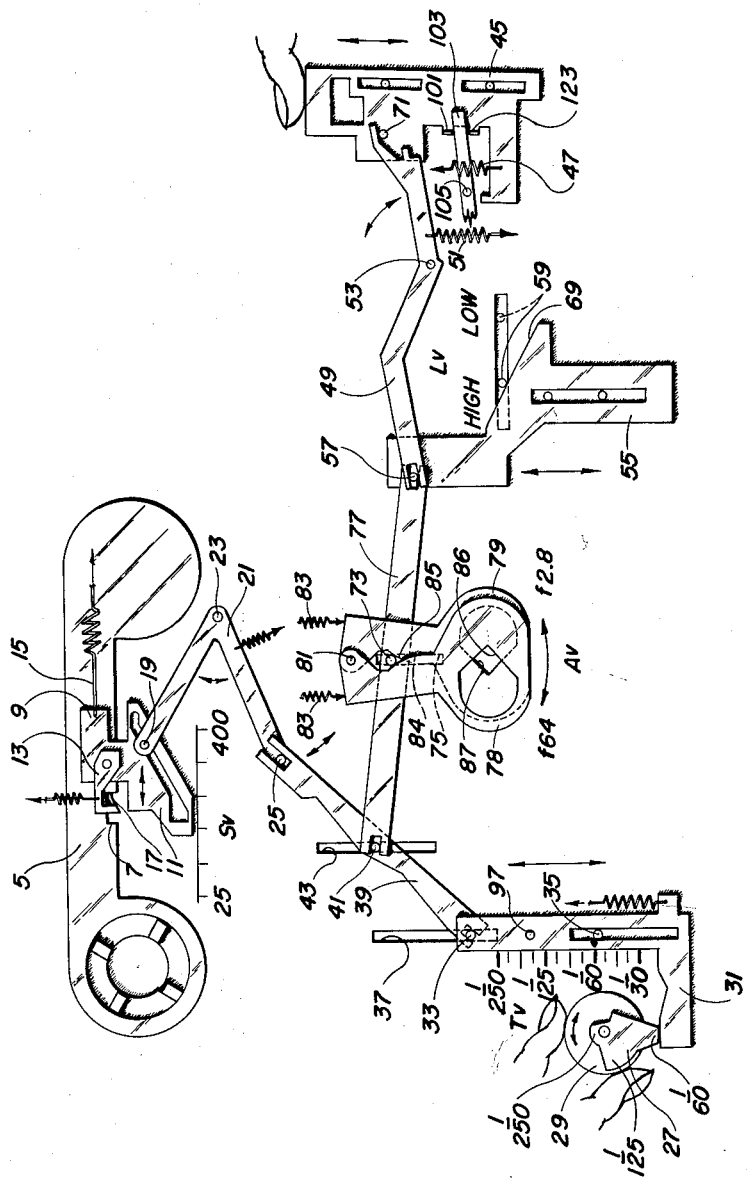
FIG. 1 is a simplified schematic diagram of the entire exposure computer mechanism.
Figure 2:
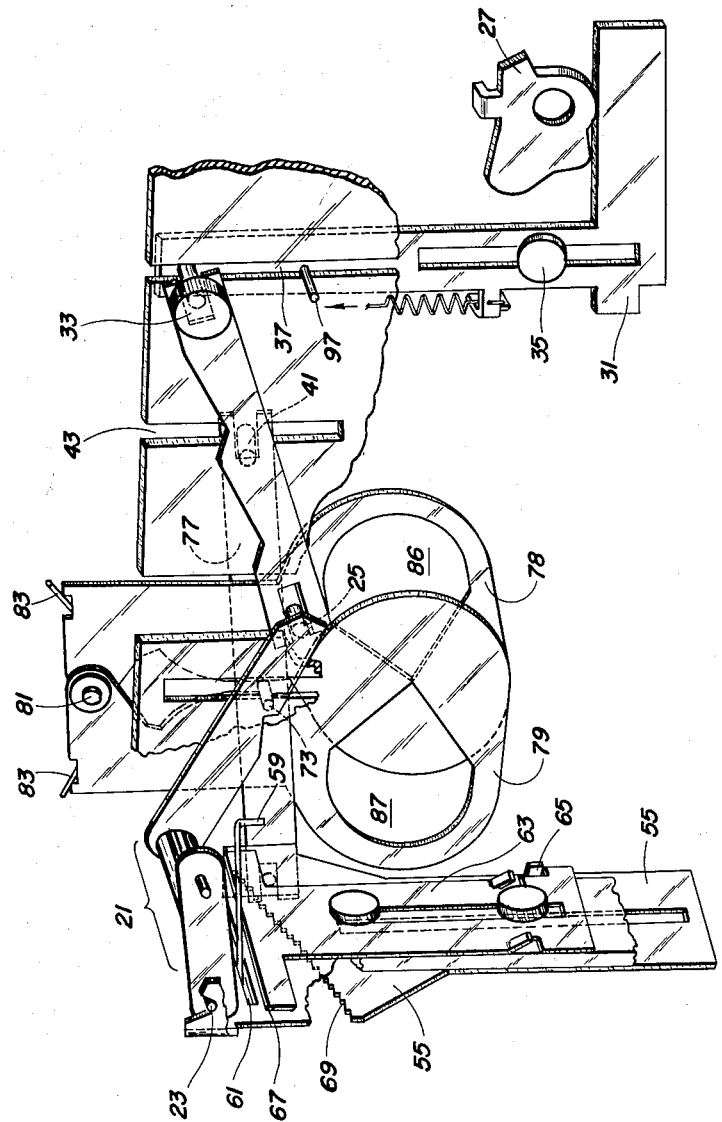
FIG. 2 is a rear view of an embodiment of the system illustrated in FIG. 1 as is might actually appear in a photographic camera, with certain parts removed to facilitate the disclosure.
Figure 3:
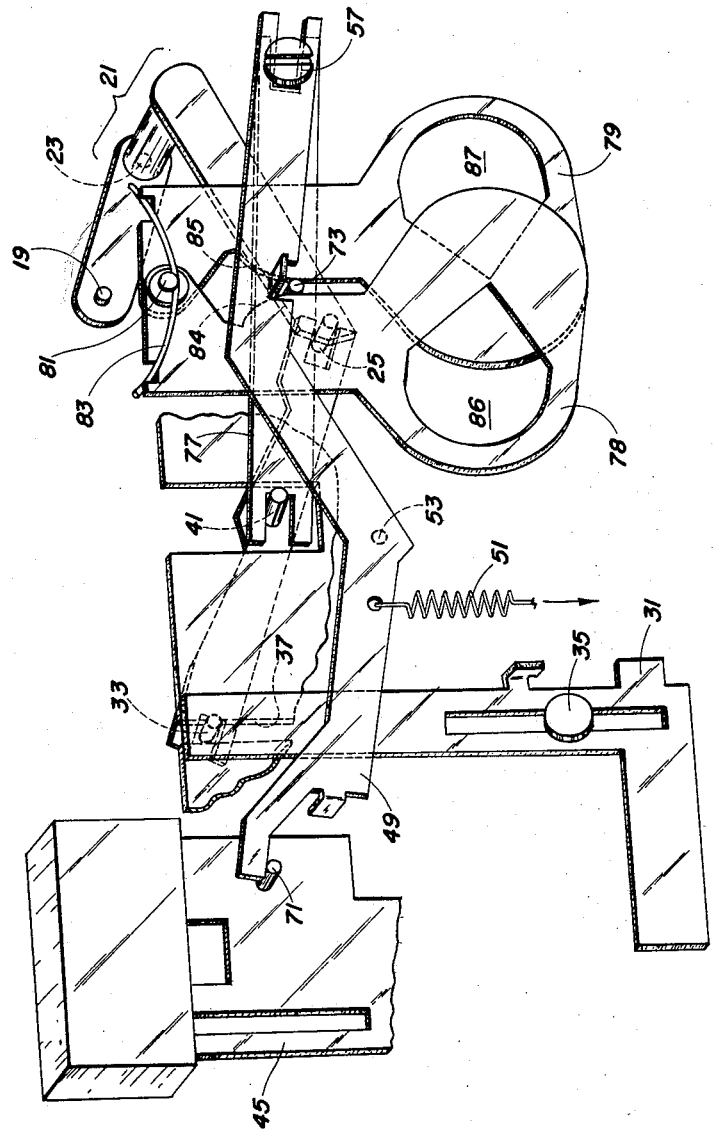
FIG. 3 is a front view of the mechanism shown in FIG. 2 with parts removed.

Referring now to FIGS. 1, 2 and 3, a film cassette 5, which is adapted to be received into the camera, carries a film code notch 7, the position of notch 7 being determined by the sensitivity of the particular film being carried by cassette 5. When the camera back (not shown) is open, slide member 9, cam element 11, and notch sensing lever 13, which comprise a film speed sensing mechanism, are all pulled against the bias of spring 15 to a position slightly to the left of that shown in FIG. 1. When, after inserting cassette 5, the camera operator then closes the back of the camera, the film speed sensing mechanism is freed to move to the right under the influence of spring 15 until such time as lug 17 of notch sensing lever 13 enters and is blocked by film code notch 7.

The further the film speed sensing mechanism moves to the right under the influence of spring 15 prior to the time lug 17 engages film code notch 7, the lower cam following pin 19 is driven by the cam surface of cam element 11. Pin 19 is attached to one end of bell crank 21 which, in turn, is attached to the camera's mounting plate by pivot 23. It can be seen that as the film speed sensing mechanism moves to the right, bell crank 21 is rotated in a counterclockwise direction about pivot 23. The position of bell crank 21 determines the position of film speed stud 25 which is attached thereto, thus providing the film speed ($S_v$) input for the computer mechanism as will be understood from the following description.

Shutter speed ($T_v$) is set into the computer by rotating shutter speed cam 27 which is positioned by a knob 29 on the outside of the camera front. The shutter speed slide 31 is spring loaded against cam 27 and has shutter speed stud 33 staked to its upper end. Shutter speed slide 31 moves in a vertical track determined by pin 35 and slot 37 both of which are integral with the camera's mounting plate.

A film and shutter speed lever 39, which is keyed at its lower end to shutter speed stud 33 and its upper end to film speed stud 25, carries, staked to its center, film and shutter speed stud 41 which moves vertically within slot 43 in the camera's mounting plate.

When body release slide 45 is depressed, overcoming the bias of heavy spring 47, actuating lever 49 is released for clockwise movement about pivot 53 under the influence of its spring 51. One end of actuating lever 49 is keyed to a meter sensing cam 55 by means of actuating stud 57, thereby causing sensing cam 55 to move in an upward direction in response to the depression of body release slide 45.

The moving needle 59 of a galvanometer device (not shown) which is part of the camera's conventional photo-responsive circuitry, protrudes through slot 61 in the camera-mounting plate and is positioned as a function of scene brightness ($L_v$). A meter-clamping slide 63, which is spring loaded upwardly against extension 65 of meter sensing cam 55, moves upwardly with sensing cam 55 until its upper surface 67 traps the meter needle 59. Meter sensing cam 55 still continues to move upwardly thereafter until its cam surface 69 contacts meter needle 59 in the manner well known in the art. When this occurs, actuating lever 49 stops its clockwise motion about pivot 53, and pin 71 on body release slide 45 moves away from actuating lever 49 as body release lever 45 continues to be depressed toward its shutter-actuating position.

Diaphragm control stud 73, which operates vertically in slot 75 in the mounting plate, is staked in the center of diaphragm lever 77. Lever 77 is keyed to meter sensing cam 55 by means of actuating stud 57, and is keyed to film and shutter speed lever 39 by means of stud 41.

Diaphragm wings 78 and 79 are attached to the mounting plate by pivot 81 and biased by spring 83 against diaphragm control stud 73. When, as explained above, meter sensing cam 55 moves upwardly in response to the depression of the body release slide 45, diaphragm lever 77 moves upwardly about film and shutter speed stud 41, the position of stud 41 having been fixed in accordance with the speed of the film in cassette 5 and the shutter speed selected by the operator. The upward movement of diaphragm lever 77 causes diaphragm control stud 73 to move upward in slot 75, thereby moving upwardly against cam surface 84 and 85 of diaphragm wings 78 and 79, permitting the diaphragm wings to open. The size of the combined aperture 86—87 ($A_v$) created by diaphragm wings 78 and 79 is determined by the distance diaphragm control stud 73 moves upwardly in slot 75 in response to the upward movement of meter sensing cam 55.

It can be seen that when the scene being photographed is extremely bright, meter sensing cam 55 will only move upwardly a short distance before contacting meter needle 59, and the relatively small movement upward of diaphragm control stud 73 will result in a relatively small combined aperture 86—87 formed by diaphragm wings 78 and 79. The lower the intensity of light ($L_v$) of the scene being photographed, the further is needle 59 positioned to the right (FIG. 1), the higher meter sensing cam 55 moves, and the greater the resulting aperture.

Figure 4:
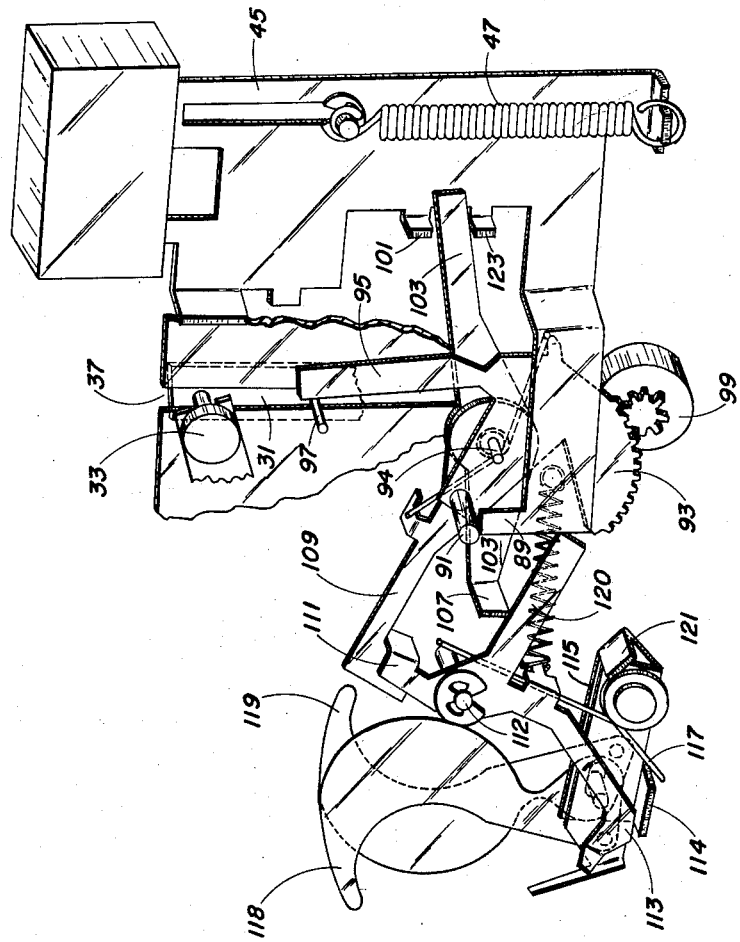
FIG. 4 is a rear view similar to FIG. 2 showing certain parts removed in FIGS. 2 and 3.

Special attention is called to the fact that the shutter speed selected by the operator, by the positioning of knob 29, may be overridden by the computer mechanism in the following manner:

In the event that diaphragm control stud 73 reaches its uppermost position in slot 75 prior to the time that the cam surface 69 of meter sensing cam 55 engages meter needle 59, diaphragm lever 77 begins to pivot about diaphragm control stud 73, driving film and shutter speed stud 41 downwardly in slot 43. Since stud 41 is staked to the center of film and shutter speed lever 39, and since the upper end of lever 39 is keyed to film speed stud 25, the position of which has been fixed in the manner explained above in accordance with the sensitivity of film in cassette 5, film and shutter speed lever 39 moves in a counterclockwise direction about film speed stud 25 in response to the downward motion of stud 41. Since the lower end of film and shutter speed lever 39 is keyed to shutter speed stud 33 which, as explained above, is staked to shutter speed slide 31, slide 31 is driven against its spring bias downwardly, away from the position to which it has been set manually, to provide a slower shutter speed. It should also be noted that the movement of shutter speed slide 31 is continuous, and, therefore, that any shutter speed may be selected from the continuum of speeds between the upper and lower limits of the shutter speed mechanism which is illustrated in FIG. 4 and operates in the following manner:

When body release slide 45 is depressed by the camera operator, its foot 89 moves away from striker pin 91 which is mounted upon time delay sector 93, permitting sector 93 to move under spring tension in a counterclockwise direction about axle 94 until cam arm 95 of time delay sector 93 engages speed control pin 97 which is staked to shutter speed slide 31. As shutter speed slide 31 is moved downwardly along slot 37 in response to either the manual setting of control knob 29 (FIG. 1) or the overriding of this manual setting in response to the upward movement of meter sensing cam 55, as explained above, speed control pin 97 moves from its position for maximum shutter speed (as shown in FIG. 4) downwardly in slot 37. Cam arm 95 co-operates with speed control pin 97 to determine the distance that time delay sector 93 will move under its spring bias. The lower the position of speed control pin 97, the greater the rotational movement of sector 93, and the more gear teeth on sector 93 which mesh with and move over the gear teeth on a retard weight 99. The further the gear teeth on the bottom of sector 93 move to the right prior to the stopping of the sector by the engagement of cam arm 95 with speed control pin 97, the slower the resulting shutter speed will be, as will be explained below.

As body release slide 45 is depressed, lug 101 on release slide 45 forces starting lever 103 to move in a clockwise direction about axle 94. Close to the bottom of the travel of body release slide 45, toe 107 of starting lever 103 engages latch lever 109 and forces lever 109 also to rotate in a clockwise direction about axle 94. This results in the release of shutter actuating lever 111 which then rotates in a counterclockwise direction about pivot 112. Heel 113 of lever 111 contacts opening lug 114 of blade lever 115 and causes it to rotate against the bias of spring 117, driving open shutter blades 118 and 119 in the manner well known in the art. After blades 118 and 119 have been completely opened, an arm 120 of shutter actuating lever 111, contacts striker pin 91 on time delay sector 93 and forces sector 93 to move in a clockwise direction about axle 94. The gear teeth on retard weight 99 mesh with the gear teeth at the bottom of sector 93, thus slowing the movement of sector 93. The desired shutter delay is determined by the distance through which time delay sector 93 must rotate prior to the time that arm 120 of shutter actuating lever 111 slips off striker pin 91, because when this occurs the shutter blades are forced closed by heel 113 of shutter actuating lever 111 striking closing lug 121 of blade lever 115.

As body release slide 45 is permitted to return upwardly to its original position under the influence of heavy spring 47, starting level 103 is driven in a counterclockwise direction by the lug 123 of body release slide 45. Toe 107 of starting lever 103 then engages arm 120 of shutter actuating lever, 111 driving lever 111 in a clockwise direction until it is latched by latch lever 109 and heel 113 rides over opening lug 114 of blade lever 115, and the shutter mechanism is reset.

It can thus be understood that when the camera operator initially loads the camera with cassette 5, film sensitivity is automatically set into the computing mechanism just described by the positioning of the upper end of film and shutter speed lever 39. The camera operator next selects his shutter speed by means of knob 29, thereby setting the lower end of lever 39 as well as the position of film and shutter speed stud 41. The operator then directs the camera toward the subject to be photographed, and the camera's photo-responsive means positions meter needle 59 in accordance with the brightness of the scene. As the operator depresses body release slide 45, the position of meter needle 59 is sensed by cam 55. At this time, correct exposure is provided by the selection of a combined diaphragm aperture 86—87 ($A_v$) in response to the movement of diaphragm lever 77 which is determined by the relative positions attained by film and shutter speed stud 41 and actuating stud 57 as functions of the exposure value variables of film speed ($S_v$), shutter speed ($T_v$), and light intensity ($L_v$). As was explained above, in the event that diaphragm wings 78 and 79 open to their full aperture before sensing cam 55 has contacted meter needle 59, the manual setting for shutter speed will be overridden sufficiently to slow down the action of shutter blades 118 and 119 to assure adequate exposure.

Although only one specific embodiment of the present invention is disclosed herein, it should understood that the particular form disclosed has been selected to facilitate explanation of the invention rather than to limit the number of forms which it may assume. Further, it should be understood that various modifications, alternations, and adaptations may be applied to this specific form described to meet the requirements of practice without in any manner departing from the spirit or scope of the present invention.

What is claimed is:

1. In an exposure control system for a photographic camera, the combination comprising: photo-responsive means including a member positionable in accordance with scene brightness; variable speed shutter means; a first control mechanism including a shutter speed setting member; a film sensitivity compensation member adjustable according to the sensitivity of film inserted into said camera; first differential bar means connecting said compensation member and said first control mechanism; a second control mechanism including a variable lens diaphragm; movable sensing means; means biasing said sensing means toward sensing engagement with said positionable member; second differential bar means connecting said sensing means and said second control mechanism; coupling means interconnecting said first and second differential means; and manually operable drive means normally biased to a rest position holding said sensing means out of engagement with said positionable member and movable through a position releasing said sensing means, the release of said sensing means into engagement with said positionable member causing the movement of said first and second control mechanisms and thereby automatically adjusting said shutter speed setting member and setting said lens diaphragm in accordance with scene brightness and film sensitivity.

2. A camera according to claim 1 including in combination therewith a film cassette adapted to be received by said camera, said cassette carrying physical indicia varying in accordance with the sensitivity of film stored therein, and wherein said film sensitivity compensation member of said exposure control system is adjustable in accordance with said physical indicia carried by said cassette when said cassette is inserted into said camera.

3. A camera according to claim 1 wherein said first control mechanism is manually adjustable to any one of a plurality of shutter speed control positions, and including means limiting the movement of said second control mechanism, said second control mechanism being moved toward the limit of its movement in response to the initial movement of said sensing means, and said first control mechanism being moved from its manually adjusted position when and only when said second control mechanism reaches the limit of its movement before said sensing means engages said positionable member.

4. A camera according to claim 1 wherein said first control mechanism is adjustable in response to the movement of said sensing means to any one of a continuous range of shutter speed control settings.

References Cited in the file of this patent

UNITED STATES PATENTS

| | | |
|---|---|---|
| 2,938,440 | Bretthauer | May 31, 1960 |
| 2,952,194 | Goshima | Sept. 13, 1960 |
| 2,967,468 | Bretthauer | Jan. 10, 1961 |
| 3,025,777 | Wilkenson | Mar. 20, 1962 |